Dec. 3, 1929.  W. L. WINDSOR, 3D  1,738,413
ROUTE INDICATOR
Filed Nov. 29, 1927  3 Sheets-Sheet 1

Inventor
Wm. L. Windsor, 3rd.

By
P. G. Quesada
Attorney

Dec. 3, 1929.   W. L. WINDSOR, 3D   1,738,413
ROUTE INDICATOR
Filed Nov. 29, 1927   3 Sheets-Sheet 2
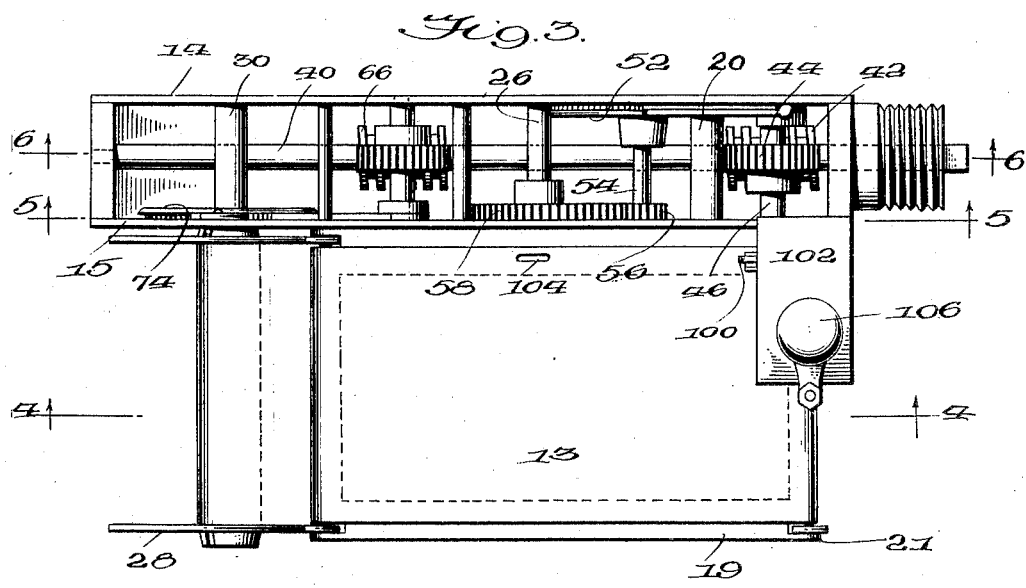
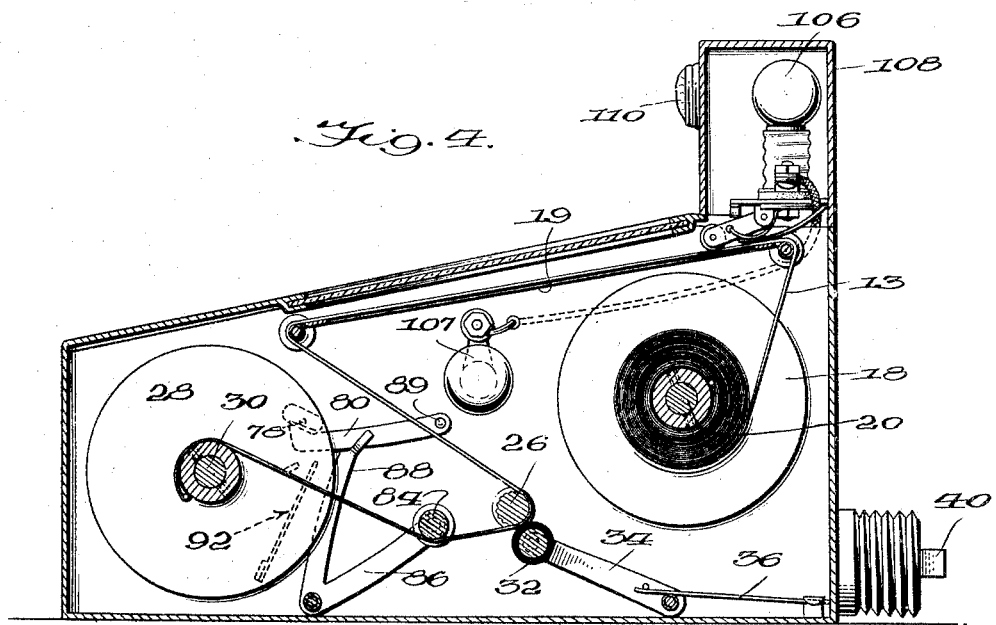
Inventor
WM. L. WINDSOR, 3RD.
By
*J. G. Quesada*
Attorney

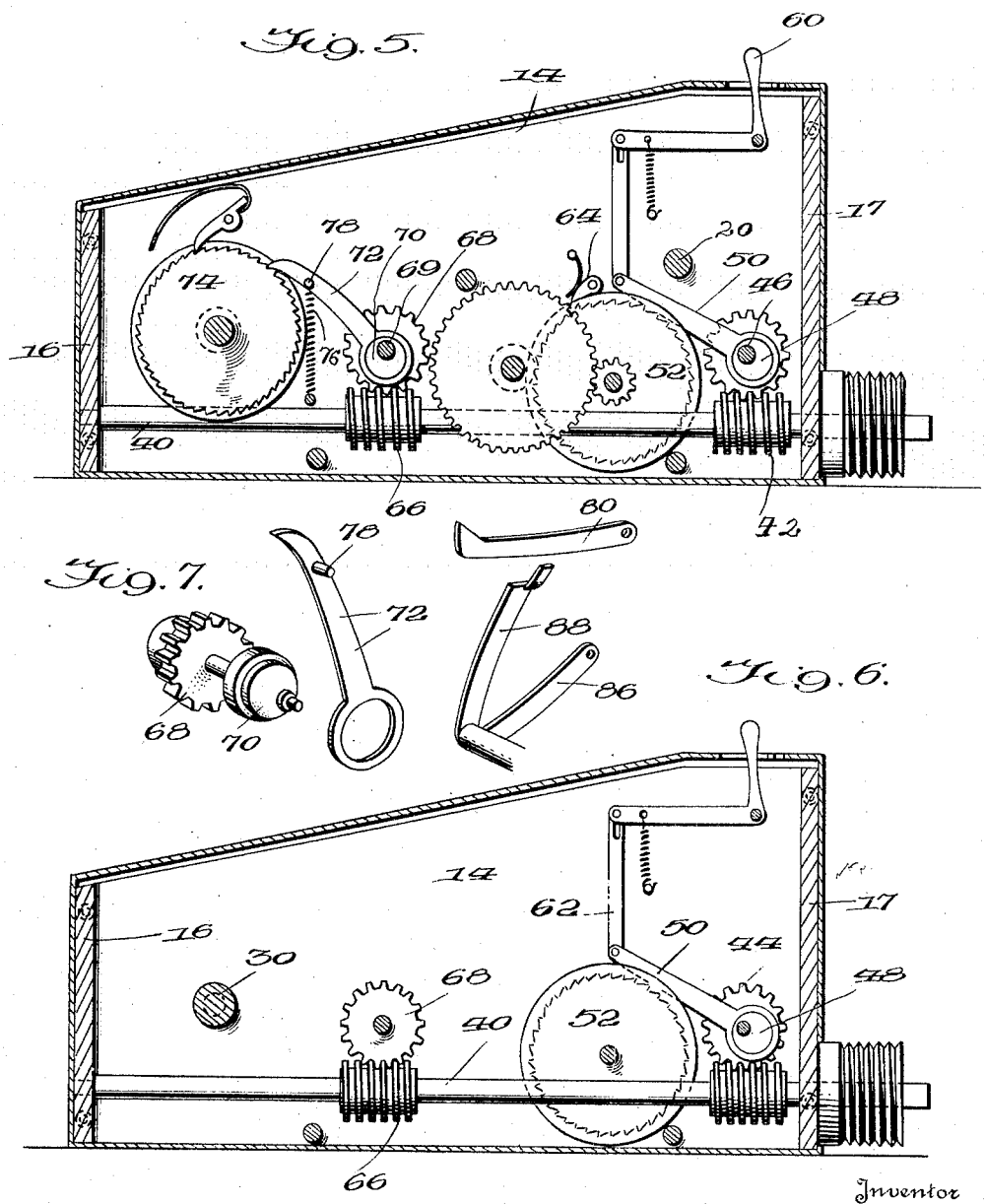

Patented Dec. 3, 1929

1,738,413

UNITED STATES PATENT OFFICE

WILLIAM L. WINDSOR, 3D, OF HARRISBURG, PENNSYLVANIA

ROUTE INDICATOR

Application filed November 29, 1927. Serial No. 236,438.

This invention relates to route indicators especially adapted for use on automobiles although not necessarily restricted to such use.

Briefly stated, an important object of the invention is to provide a route indicator having simple means responsive to the movement of the vehicle on which the same is installed to visually indicate the proper course, curves in the road, railroad crossings, bridges, cross roads and other things of which the occupants of the vehicle should receive advance notice to add to the safety, enjoyment and comfort of travel over unfamiliar roads.

A further and equally important object is to provide a route indicator embodying reliable means by which an alarm is given to apprise the operator in advance of the need of special caution at points along the line of travel.

The invention also contemplates the provision of a route indicator in which an excess tension on the movable indicia bearing web is effectively avoided whereby the possibility of rending the web is reduced to a minimum.

The invention has as a further aim the provision of a route indicator which may be installed on a motor vehicle either during manufacture or at any time thereafter without marring the appearance of the vehicle or in any way impairing the functions of the same.

Other objects and advantages will be apparent during the course of the following description.

Figure 1:
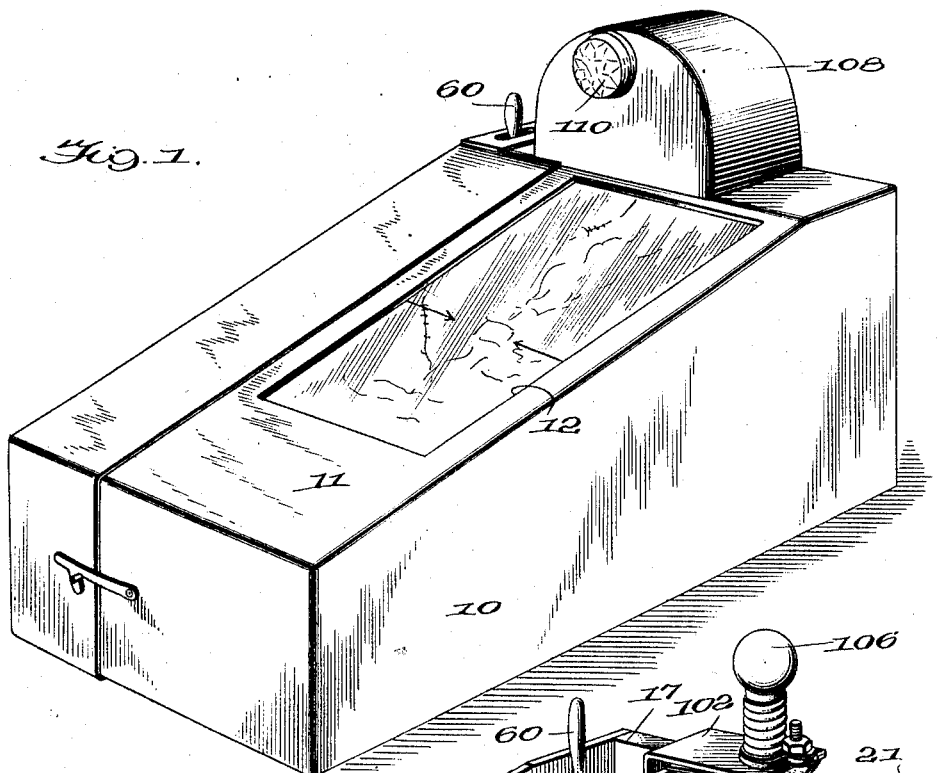
Figure 2:
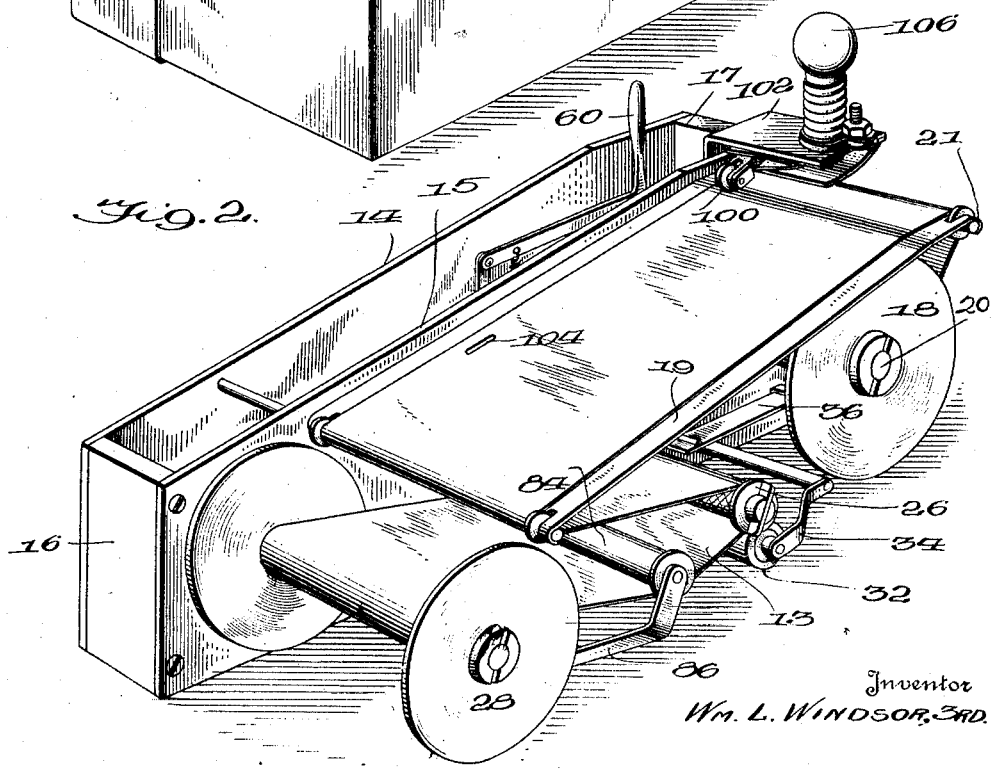

In the accompanying drawings forming a part of this application and in which like numerals are employed to designate like parts throughout the same, Figure 1 is a perspective of the improved route indicator, Figure 2 is a similar view with the casing thereof removed, Figure 3 is a plan view of the route indicator with the casing thereof removed, Figure 4 is a vertical longitudinal sectional view taken on line 4—4 of Figure 3, the view being taken in the direction of the arrows, Figure 5 is a vertical longitudinal sectional view taken on line 5—5 of Figure 3, the view being taken in the direction of the arrows, Figure 6 is a vertical longitudinal sectional view taken on line 6—6 of Figure 3, the view being taken in the direction of the arrows, Figure 7 is a group perspective illustrating several parts of the improved route indicator.

In the drawings wherein for the purpose of illustration is shown a preferred embodiment of the invention, the numeral 10 designates a casing having a sloping top 11 provided with a sight opening 12 beneath which an indicia bearing web 13 moves to indicate various points along the line of travel. Suitable means may be provided to attach the casing 10 to the dash, the steering post, or any other convenient point on the automobile. Figure 1 clearly illustrates that the casing may, if desired, be made in two sections adapted to interfit to enclose the mechanism illustrated in Figure 2. However, the specific structure of the casing is optional.

In carrying out the invention the movable mechanism of the improved route indicator is carried by a more or less elongated frame or support comprising, in part, spaced side walls 14 and 15 and end walls 16 and 17. The end walls 16 and 17 may be connected to the side walls 14 and 15 by screw bolts or other suitable fastening devices.

Referring now to Figures 2 and 4 it will be seen that a web dispensing or supply spool 18 is mounted on a transversely extending spindle 20 extended through and anchored to the spaced side walls 14 and 15. Figure 2 clearly illustrates that the spool 18 is disposed entirely at one side of the walls 14 and 15 and that the web extends from the spool 18 over a web supporting frame 19. This figure further illustrates that the ends of the web supporting frame 19 are provided with attaching fingers 21 embracing a pair of spaced arms 22. The arms 22 extend laterally from and are rigidly supported by the spaced walls 14 and 15. Suitable anti-friction means, such as rollers or sleeves, are shown to be mounted on the arms 22 for engagement by the movable web. The ends of these sleeves or rollers mounted on the arms 22 are flanged to hold the web against lateral movement. It will be observed that the sleeves or rollers which provide for the easy movement of the web over the frame 19 are confined between and are, therefore, held against endwise movement by the fingers 21.

That portion of the web which has passed over the web supporting frame 19 is trained about a serrated driving or feed roller 26. The web is shown in Figure 4 to be connected to and adapted to be wound upon a receiving spool 28 keyed in any suitable manner to a driving spindle 30. Figure 3 clearly illustrates that the spindle 30 is rotatably extended through and is supported by the spaced side walls 14 and 15.

From the foregoing it will be seen that the web initially wound on the dispensing spool 18 is trained over the web supporting frame 19 for observation by the operator and is extended about the feed roller 26 from which point the web is wound upon the receiving spool 28.

It might be pointed out that a pressure roller 32 is carried by a U-shaped frame 34 and urges the web into pressure contact with the feed roller through the action of a leaf or other spring 36. The U-shaped frame may have a tubular bight portion to freely and detachably receive an attaching stem extended through and rigidly connected to the spaced side walls 14 and 15 of the main frame.

Coming now to the driving means for the web, attention is invited to Figures 5 and 6 which illustrate that a main driving shaft 40 is extended longitudinally between the spaced side walls 14 and 15 and is rotatably supported by the end walls 16 and 17. The main driving shaft 40 may be provided with a suitably shaped end by which the same may be connected to a suitable driving means, such as a flexible shaft, extending from the transmission, the propeller shaft, the axle, or any other convenient place on the motor vehicle.

The driving shaft 40 is provided with a worm 42 in constant mesh with a worm wheel 44 keyed or otherwise secured on a counter shaft 46. The counter shaft is rotatably carried by the side walls 14 and 15 and is provided with an eccentric disk or cam 48 about which the attaching strap of a pawl 50 is extended so that the turning of the main shaft 40 will result in the regular longitudinal movement of the pawl 50. The pawl 50 is shown in Figure 5 to be provided at a point spaced from the forward or the upper end thereof with a tooth adapted to engage the teeth of a ratchet wheel 52. Referring now to Figure 3 it will be seen that the ratchet wheel 52 is keyed on a shaft 54 on which a spur gear 56 is also keyed. The spur gear 56 is shown to have constant mesh with a second spur gear 58 of substantially greater diameter. In fact it is intended that the ratio between the gears 56 and 58 shall be four to one to bring about a predetermined movement of the web for each mile of vehicle travel, but, of course, the question of ratio is immaterial.

The spur gear 58 is keyed or otherwise secured to the driving roller 26 to impart the gear movement to the web.

The pawl 50 may be removed from driving engagement with the ratchet wheel 52 by any suitable means and by way of illustration I have included a bell crank 60 having connection with the pawl through the medium of a link 62. Suitable means may be provided to hold the bell crank 60 in a set position. Obviously, the device is to be allowed to operate only when it is intended to bring about the movement of the indicia bearing web.

A spring pressed pawl 64 is engaged with the teeth of the ratchet wheel 52 to hold the ratchet wheel against back turning.

Figures 5 and 6 also illustrate that a second worm wheel 66 is keyed or otherwise secured on the main drive shaft 40 and is in constant mesh with a worm wheel 68 suitably keyed to a shaft 69. The shaft 69 is rotatably carried by the spaced side walls 14 and 15 and is provided with an eccentric or cam 70 about which the attaching strap of a pawl 72 is extended. By this construction, the rotation of the main drive shaft 40 imparts a regular longitudinal movement to the pawl 72.

The pawl 72 is shown to be urged into engagement with the teeth of a ratchet wheel 74 by a spring 76. The spring 76 is anchored at the lower end thereof to the adjacent portion of the side wall 15 while the upper end of the spring is attached to a pin 78. For a purpose which will shortly appear, the pin 78 is, as shown in Figure 4, extended through the side wall 15 and is adapted for engagement by a releasing arm 80.

The ratchet wheel 74 is keyed or otherwise secured to the spindle 30 of the receiving spool 28 so that the movement imparted to the ratchet wheel is transmitted to the receiving spool for winding the web thereon.

Referring now to Figures 2 and 4, it will be seen that a tension roller 84 is extended across and is in constant engagement with the upper surface of the web at a point between the roller 26 and the receiving spindle 28 and is carried by a U-shaped support 86. It is illustrated in Figure 4 that the bight portion of the support 86 is in the nature of a tube or sleeve freely mounted on a spindle carried by and rigidly attached to the side walls 14 and 15. Thus, the frame 86 is allowed to rock as a result of variations in the tension of the web. Also, it is a simple matter to detach the U-shaped frame 86 from the supporting stem thereof.

The U-shaped roller support 86 is provided with an angularly extended arm 88 provided at the upper end thereof with means to engage and move the arm 80 on the pivot 89. The arm 80 is positioned beneath and is adapted to engage the pin 78 whereby the pawl 72, clearly shown in Fig. 5, may be automatically removed from driving engagement with the ratchet wheel 72. This interrupts the drive between the main shaft 40 and the receiving spool.

From the foregoing it will be seen that should the tension of the web exceed a predetermined value, the portion of the web between the feed roller 26 and the receiving spool 28 will be drawn somewhat taut to move the tension responsive roller 84 upward and thereby rock the arms 88 and 80 to bring about the release of the pawl 72 from engagement with the teeth of the ratchet wheel 74. By this construction the building up of an excessive tension in the web is avoided and the possibility of rupturing the web is thereby greatly reduced. However, this arrangement does not in any way disturb the rate of feed of the web or result in excessive slack in the web.

Figure 4 illustrates that a spring 92 is disposed in the path of travel of and is adapted to be engaged by the arm 88 to urge the arm and the tension responsive roller 84 to the position illustrated in Figure 4 subsequent to the temporary interruption of the driving connection between the main drive shaft 40 and the receiving spool. Figure 4 also illustrates that the upper terminal of the arm 88 is provided with an offset finger which extends along one side of and guides the releasing arm 80. In other words, the finger cooperates with the side wall 15 in holding the arm 80 against undue lateral movement.

With reference to the foregoing description taken in connection with the accompanying drawings it will be seen that when the device is set in operation by the engagement of the pawl 50 with the ratchet wheel 52 the feed roller 26 will be turned to bring about the travel of the web beneath the sight opening so that the occupants of the vehicle may be duly apprised of the various points being approached along the line of travel. Clearly, the indicia on the web 13 may comprise notations of sharp curves, bridges, railroad crossings, historical places, and other points of which the passengers should be apprised to add to the safety and enjoyment of travel by motor vehicle. An electric bulb 107 is located beneath the web to illuminate the indicia thereon.

The invention also embodies an alarm by which the operator is warned of a dangerous point being approached and in this connection attention is invited to Figures 2 and 4 which illustrate that a roller contact 100 is carried by a bracket 102 and is in the path of travel of and is adapted to extend through slots or perforations 104 in one marginal portion of the web. When the roller contact 100 is extended through the perforation or perforations a circuit is closed to light an electric bulb 106. The bulb 106 is enclosed within a casing 108 having a red bull's eye or lens 110 in plain view of the operator. When the bulb 106 is lighted, the operator is thereby warned of the need of special caution at a predetermined point in the road. In other words, the warning may be given a sixteenth or an eighth of a mile in advance of the actual danger. If desired, a circuit closer may be employed in connection with an audible signal and will remain closed until the point of danger has been reached or passed.

For the purpose of originally charting various routes a blank scaled or calibrated web may be employed and since the web movement is very slow it is a simple matter to make notations or recordations of any nature thereon. Since the web is scaled it may be easily ascertained with certainty upon the removal of the web at what points the various notations were made.

It is to be understood that the form of invention herewith shown and described is to be taken merely as a preferred example of the same and that such minor changes in arrangement and construction of parts may be made as will remain within the spirit of the invention and the scope of what is claimed.

Having thus described the invention, what is claimed is:

1. A route indicator comprising dispensing and receiving spools, a web having connection with said spools, a feed roller engaging said web independently of said spools, a driving device associated with said receiving spool and embodying a pawl and ratchet, and web actuated means to release said pawl from operative engagement with said ratchet wheel when the tension of the web exceeds a predetermined value.

2. A route indictor comprising dispensing and receiving spools, a web having connection with said spools, a web actuated roller extended across the web and engaged thereby, a U-shaped support for said roller, means pivotally mounting said support, a releasing arm having rigid connection with said U-shaped support, a driving mechanism having connection with one of said spools and embodying a pawl and ratchet motion transmitting mechanism, the pawl being provided with a lateral projection, there being means cooperating with said releasing arm to engage said projection of the pawl to remove the pawl from driving engagement with said ratchet.

3. A route indicator comprising dispensing and receiving spools, a web having connection with said spools, a web actuated member associated with the web, a U-shaped support for said web actuated member, a pivotal mounting for said support, an arm having rigid connection with said support, a second arm engaged by and actuated by said first-named arm, a driving mechanism for said receiving spool and embodying a releasable driving member having a laterally projecting pin in the path of travel of and adapted to be engaged by said second-named arm whereby an increase in the tension of the web beyond a predetermined value moves said releasable driving member into inoperative position.

4. A route indicator comprising dispensing and receiving spools, a web having connection with said spools, a web actuated member associated with the web, a support for said web actuated member, a pivotal mounting for said support, an arm having rigid connection with said support, a second arm engaged by and actuated by said first-named arm, a driving mechanism for said spool and embodying a releasable driving member having a laterally projecting pin in the path of travel of and adapted to be engaged by said second-named arm whereby an increase in the tension of the web beyond a predetermined value moves said releasable driving member into inoperative position, a feed roller extending across said web between said spools and being independent of said releasable driving member and adapted to move the web during the inoperativeness of said releasable driving member, and a pressure roller associated with said feed roller and said web.

5. A route indicator comprising dispensing and receiving spools, a web having connection with said spools, a web actuated member associated with the web, a support for said web actuated member, a pivotal mounting for said support, an arm having rigid connection with said support, a second arm engaged by and actuated by said first-named arm, said first named arm being provided with means limiting lateral movement of said second named arm, a driving mechanism for said spool and embodying a releasable driving member having a laterally projecting pin in the path of travel of and adapted to be engaged by said second-named arm whereby an increase in the tension of the web beyond a predetermined value moves said releasable driving member into inoperative position, a feed roller extending across said web between said spools and being independent of said releasable driving member and adapted to move the web during the inoperativeness of said releasable driving member, and an alarm associated with said web.

6. A route indicator comprising a frame having spaced side and end walls, spindles carried by said side walls, dispensing and receiving spools on said spindles, a web having connection with said spindles, a driving shaft carried by said end walls and extending between said side walls, a ratchet wheel having connection with one of said spindles, a pawl for driving said ratchet wheel, a motion transmitting means between said shaft and said pawl, and web operated means to move said pawl out of engagement with said ratchet wheel when the tension of the web exceeds a predetermined value.

7. A route indicator comprising a frame having spaced side and end walls, spindles carried by said side walls, dispensing and receiving spools on said spindles, a web having connection with said spools, a driving shaft carried by said end walls and extending between said side walls, a ratchet wheel having connection with one of said spindles, a pawl for driving said ratchet wheel, a motion transmitting means between said shaft and said pawl, web operated means to move said pawl out of engagement with said ratchet wheel when the tension of the web exceeds a predetermined value, a feed roller engaging said web, and a driving mechanism connecting said web and said shaft independently of said pawl and ratchet.

8. In a route indicator, a frame embodying spaced side walls and spaced end walls, a main driving shaft extending between said walls and rotatably carried by said end walls, spindles carried by said spaced side walls, dispensing and receiving spools carried by said spindles and disposed entirely at one side of said walls, a web having connection with said spools and bearing indicia, a driving mechanism for one of said spindles and having a releasable member, web actuated means for moving said member to inoperative position, and a separate driving mechanism having connection with said main shaft and said web and being carried by said side walls.

9. In a route indicator, the combination of a frame having spaced side walls, arms rigidly connected to the side walls and extended laterally beyond one side of the frame, a web supporting frame having corners provided with fingers embracing said arms, anti-friction elements on said arms and confined between said fingers, and a web movable over said frame and being trained about said anti-friction elements.

10. In a route indicator, the combination of a frame having spaced side walls, arms rigidly connected to the side walls and extended laterally beyond one side of the frame, a web supporting frame having fingers embracing said arms, anti-friction elements on said arms and confined between said fingers, a web movable over said frame and being trained about said anti-friction elements, spindles carried by said spaced side walls and being extended beyond one side of the frame, spools carried by said spindles, and an indicia bearing web extending over the web supporting frame and having connection with said spools.

11. In a route indicator, the combination of a frame having spaced side walls, arms rigidly connected to the side walls and extended laterally beyond one side of the frame, a web supporting frame having corners provided with fingers embracing said arms, anti-friction elements on said arms and confined between said fingers, a web movable over said frame and being trained about said anti-friction elements, spindles carried by said spaced side walls and being extended beyond one side of the frame, spools carried by said spindles, an indicia bearing web extending over the web supporting frame and having connection with said spools, and a source of light beneath said frame to illuminate that portion of the web extending over the web supporting frame.

12. In a mechanism of the character described, a spool, a web having connection with the spool, means for turning the spool and comprising a pawl and ratchet, and a web actuated member to release the pawl from operative engagement with the ratchet when the tension of the web exceeds a predetermined value, and yieldable means urging said pawl into engagement with said ratchet.

In testimony whereof I affix my signature.

WILLIAM L. WINDSOR, 3RD.